United States Patent
Kim et al.

(10) Patent No.: US 9,660,296 B2
(45) Date of Patent: May 23, 2017

(54) ELECTRODE ASSEMBLY HAVING STEP, BATTERY CELL, BATTERY PACK AND DEVICE INCLUDING THE SAME

(71) Applicant: LG Chem, Ltd., Seoul (KR)

(72) Inventors: Young-Hoon Kim, Daejeon (KR); Sung-jin Kwon, Daejeon (KR); Soon-Ho Ahn, Daejeon (KR); Dong-Myung Kim, Daejeon (KR); Ki-Woong Kim, Daejeon (KR); Seung-Min Ryu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/091,918

(22) Filed: Nov. 27, 2013

(65) Prior Publication Data

US 2014/0087224 A1  Mar. 27, 2014

Related U.S. Application Data

(63) Continuation of application No. PCT/KR2013/004856, filed on May 31, 2013.

(30) Foreign Application Priority Data

May 31, 2012 (KR) .................. 10-2012-0058243
Nov. 9, 2012 (KR) .................. 10-2012-0127028
May 31, 2013 (KR) .................. 10-2013-0069034

(51) Int. Cl.
*H01M 10/0583* (2010.01)
*H01M 10/0587* (2010.01)
(Continued)

(52) U.S. Cl.
CPC ....... *H01M 10/0583* (2013.01); *H01M 2/266* (2013.01); *H01M 10/0459* (2013.01); *H01M 10/0585* (2013.01); *H01M 10/0587* (2013.01)

(58) Field of Classification Search
CPC ......... H01M 10/0459; H01M 10/0583; H01M 10/0585; H01M 10/0587; H01M 2/266
(Continued)

(56) References Cited

U.S. PATENT DOCUMENTS 7,269,077 B2  9/2007 Chiu et al.
7,273,674 B1  9/2007 Frustaci et al.
(Continued)

FOREIGN PATENT DOCUMENTS

CN  1363121 A  8/2002
CN  201364932 Y  12/2009
(Continued)

OTHER PUBLICATIONS

Yeong-Cheol Jang, Machine Translation of Korean Patent Publication 10-2003-0066960.*
(Continued)

*Primary Examiner* — Nicholas P D'Aniello
*Assistant Examiner* — Ling R Zeng
(74) *Attorney, Agent, or Firm* — Lerner, David, Littenberg, Krumholz & Mentlik, LLP

(57) ABSTRACT

There is provide an electrode assembly including an electrode laminate having a plurality of electrode units rolled up to be stacked on one another in at least two rectangularly shaped separation films, the electrode assembly being characterized in that at least one of two rectangularly shaped separation films is disposed on upper and lower surfaces of the respective electrode unit, at least one separation film disposed on one surface being different from a separation film disposed on another surface, and the electrode laminate includes at least one step formed by stacking an electrode unit having a difference in area from an electrode unit adjacent thereto, having one of the rectangularly shaped separation films as a boundary therebetween.

29 Claims, 20 Drawing Sheets

(51) Int. Cl.
*H01M 2/26* (2006.01)
*H01M 10/04* (2006.01)
*H01M 10/0585* (2010.01)

(58) Field of Classification Search
USPC .......................................... 429/163, 246, 94
See application file for complete search history.

(56) References Cited

U.S. PATENT DOCUMENTS

| | | | |
|---|---|---|---|
| 2001/0005561 A1 | 6/2001 | Yamada et al. | |
| 2002/0160257 A1* | 10/2002 | Lee et al. | 429/130 |
| 2008/0280208 A1* | 11/2008 | Naoi | H01M 10/0431 |
| | | | 429/247 |
| 2010/0167112 A1 | 7/2010 | Honda et al. | |
| 2010/0190081 A1 | 7/2010 | Park et al. | |
| 2010/0304198 A1* | 12/2010 | Ahn et al. | 429/94 |
| 2012/0110836 A1 | 5/2012 | Oh et al. | |
| 2012/0196167 A1 | 8/2012 | Kim et al. | |
| 2013/0143088 A1 | 6/2013 | Cho et al. | |

FOREIGN PATENT DOCUMENTS

| | | |
|---|---|---|
| CN | 201946703 U | 8/2011 |
| EP | 1154500 A2 | 11/2001 |
| EP | 2256853 A1 | 12/2010 |
| EP | 2750239 A1 | 7/2014 |
| JP | H07-335244 A | 12/1995 |
| JP | 2001028275 A | 1/2001 |
| JP | 2001167743 A | 6/2001 |
| KR | 20030066960 A | 8/2003 |
| KR | 10-2008-0030700 A | 4/2008 |
| KR | 20090120502 A | 11/2009 |
| KR | 10-2010-0118173 A | 11/2010 |
| KR | 20110037781 A | 4/2011 |
| KR | 10-2012-0039469 A | 4/2012 |
| WO | 2011/122868 A2 | 10/2011 |
| WO | 2012/009423 A1 | 1/2012 |
| WO | 2013/176533 A1 | 11/2013 |

OTHER PUBLICATIONS

Search Report from European Application No. 13796761.8, dated Jan. 15, 2015.

Office Action from corresponding Chinese Application No. 201380002644.8, dated Jun. 30, 2015.

* cited by examiner

ELECTRODE ASSEMBLY HAVING STEP, BATTERY CELL, BATTERY PACK AND DEVICE INCLUDING THE SAME

CROSS-REFERENCE TO RELATED APPLICATIONS

This application is a continuation of PCT/KR2013/004856 filed on May 31, 2013, which claims the priorities of Korean Patent Application Nos. 10-2012-0058243 filed on May 31, 2012, 10-2012-0127028 filed on Nov. 9, 2012, and 10-2013-0069034 filed on May 31, 2013, in the Korean Intellectual Property Office the disclosures of which are incorporated herein by reference.

BACKGROUND OF THE INVENTION

Field of the Invention

Aspects of embodiments relate to an electrode assembly, and more particularly, to an electrode assembly having a step and having at least two types of electrode unit having different sizes.

Aspects of embodiments relate to a method of manufacturing a battery cell, a battery pack, a device and a battery including the electrode assembly described above.

Description of the Related Art

As the technical development of mobile devices and demand therefor has increased, demand for secondary batteries has also rapidly increased. Particularly, a lithium secondary battery having excellence in terms of energy density, an operating voltage level, management and extended lifespan characteristics has been widely used as an energy source in various electronic products as well as in various mobile devices.

In general, lithium secondary batteries have a structure in which an electrode assembly and an electrolyte are sealed inside battery cases, are largely classified as cylindrical batteries, angular batteries, pouch-type batteries, and the like, according to appearances thereof, and may also be classified as lithium ion batteries, lithium ion polymer batteries, lithium polymer batteries and the like.

In accordance with the recent tendency toward miniaturized mobile devices, demand for thin angular batteries and pouch-type batteries has increased. In particular, interest in lightweight pouch-type batteries has increased.

An electrode assembly accommodated in a battery case may be classified as a jelly-roll type (rolled type) electrode assembly, a stacked type (laminated type) electrode assembly, a laminated and stacked type electrode assembly, or a stacked and folded type (composite type) electrode assembly according to types thereof.

The jelly-roll type electrode assembly is manufactured by coating and pressing an electrode active material on a meal foil used as a current collector plate to be cut to have a band form having a required width and length. Then, a cathode and an anode are partitioned using a separation film to be helically rolled, thereby manufacturing the jelly-roll type electrode assembly. In addition, the stacked type electrode assembly is formed by stacking a cathode, a separation film and an anode in a vertical direction. Further, the composite electrode assembly may be manufactured in a scheme in which a plurality of unit cells including a cathode/a separation film/an anode are disposed on a sheet type separation film and the sheet type separation film is folded such that the unit cells are stacked on one another.

In general, since an electrode assembly according to the related art is manufactured in a scheme in which unit cells having the same size as each other or individual electrodes are stacked, a degree of freedom in terms of shape is considerably reduced, and thus, there are many limits on implementing various designs. Moreover, in order to alter a design, there are many cases in which a relatively complicated and difficult process is required to be undertaken at the time of manufacturing individual electrodes, stacking electrodes of electrical connection.

As such, recent mobile devices have been produced as various types of new product, and therefore, batteries mounted in mobile devices have also been required to have various forms. Accordingly, a new type of electrode assembly in a scheme for easily manufacturing a battery able to be varied to have various forms depending on a form of a device to which a battery cell is to be applied is required to comply with the requirement, based on the form of mobile devices.

An aspect of an embodiment provides an electrode assembly able to be implemented in various designs.

An aspect of an embodiment provides an electrode assembly being light and having excellent electrical capacitance characteristics.

An aspect of an embodiment provides a battery cell, a battery pack and a device including an electrode assembly according to an aspect of the inventive concept.

SUMMARY OF THE INVENTION

An aspect of an embodiment provides an electrode assembly including an electrode laminate having a plurality of electrode units rolled up to be stacked on one another in at least two rectangularly shaped separation films, the electrode assembly being characterized in that different rectangularly shaped separation films are disposed on upper and lower surfaces of at least a portion of an electrode unit among the plurality of electrode units, and the electrode laminate includes at least one step formed by stacking an electrode unit having a difference in area from an electrode unit adjacent thereto, having one of the rectangularly shaped separation films as a boundary therebetween.

The electrode assembly may include one or two steps.

The electrode laminate may be a stacked and folded type electrode laminate, for example, a winding-type electrode laminate rolled up in a single direction or a Z-folding type electrode laminate rolled up in a zigzag manner.

The electrode laminate may include electrode units disposed on one surface or both surfaces of the rectangularly shaped separation film to be rolled up.

The step may be formed by allowing electrodes having opposing polarities to face each other, having the rectangularly shaped separation film as a boundary therebetween. Among the electrodes having opposing polarities, an electrode having a relatively large area may be a cathode.

The respective electrode unit may be at least one selected from a group configured of unit cells in which a cathode, an anode, and at least one cathode and at least one anode having a separation film interposed therebetween may be alternately stacked on one another. In this case, the respective unit cell may be at least one selected from a group configured of a jelly-roll type unit cell, a stacked type unit cell, a laminated and stacked type unit cell, and a stacked and folded type unit cell. The unit cell may include at least one step.

The electrode assembly may further include a single electrode stacked on at least one stacking surface of upper and lower portions of the electrode laminate. In this case, the single electrode may form the step together with the electrode laminate. The single electrode may be an electrode having a polarity opposed to that of an electrode disposed on an edge of the stacking surface of the electrode laminate.

The electrode assembly may further include at least one second electrode laminate selected from a group configured of a stacked type electrode laminate, a laminated and stacked type electrode laminate, a jelly-roll type electrode laminate, a stacked and folded type electrode laminate and an electrode laminate formed by combining at least two thereof, as the electrode laminate stacked on one stacking surface of upper and lower portions of the electrode laminate. In this case, the second electrode laminate may have a step.

The electrode assembly may further include a single electrode stacked on at least one laminate of the electrode laminate and the second electrode laminate.

The plurality of electrode units may have the same thickness or different thicknesses.

The separation film may be disposed outside, an electrode disposed on an outermost portion of the electrode assembly in a thickness direction thereof may be a single surface coated electrode having an uncoated portion without being coated with an electrode active material on one surface thereof, the uncoated portion may be disposed to be directed toward the outside, and the separation film may be exposed to the outside. In this case, the single coated electrode may be an anode.

The separation film may be disposed outside, and the electrode disposed on the outermost portion of the electrode assembly may be a cathode.

The electrode laminate may include at least one electrode unit having at least one corner portion having a different shape.

The electrode laminate may include at least one electrode unit having at least one corner portion having a curved-surface shape. In this case, the electrode units having the at least one corner portion having the curved-surface shape may be provided in an amount of at least two, and the at least one electrode unit may have a corner portion having a curved-surface shape having curvature different from that of other electrode units.

The electrode laminate may be stacked such that areas of the electrode units are reduced, in a thickness direction in which the electrode units are stacked, and the electrode laminate may be stacked in an array in which one corners of the respective electrode units coincide with each other.

The electrode laminate may be stacked such that one of the electrode units adjacent to each other is included in a stacking surface of a different electrode unit. In this case, the electrode laminate may be stacked such that centers of the electrode units coincide with each other.

The electrode units may include an electrode tab corresponding to a polarity of a respective electrode, and the electrode tabs may have the same size or different sizes. The electrode tab may be adhered to an end of one of the electrode units or ends thereof facing each other.

An aspect of an embodiment provides a battery cell provided by including the electrode assembly described above, to be accommodated in a battery case. The battery cell may be a lithium ion secondary battery or a lithium ion polymer secondary battery. The battery case may be a pouch type case. In this case, the battery case may receive the electrode assembly therein and may include a step or an inclined surface to correspond to a shape of the electrode assembly.

An aspect of an embodiment provides a device including at least one battery cell as described above. In this case, the battery cell may include a systematic component of the device in surplus space thereof. The device may be a mobile phone, a portable computer, a smartphone, a smartpad, a netbook computer, a light electric vehicle, an electric vehicle, a hybrid electric vehicle, a plug-in hybrid electric vehicle, or a power storage device.

As set forth above, according to embodiments of the inventive concept, an electrode assembly having a step may be obtained by stacking electrode units on one another in a stacked and folded scheme using at least two rectangularly shaped separation films, through a single process, thereby implementing various designs of batteries.

In manufacturing an electrode assembly having a step, an anode and a cathode may be alternately disposed to have a separation film as a boundary therebetween, such that an electrode assembly may be manufactured using a single electrode without manufacturing a unit cell, as well as obtaining an assembled unit cell, thereby simplifying a process.

An electrode assembly having a step according to an embodiment may be used in manufacturing a battery, whereby a dead space generated due to an element in terms of a design may be significantly reduced so as to increase space occupancy and improve battery capacity.

In addition, an electrode assembly is provided such that different type electrodes face each other at an interface between unit cells having different sizes, and therefore, an electrochemical reaction may be generated in an interface portion. As a result, a relatively high output may be implemented as compared to an existing battery having the same size.

While the inventive concept has been shown and described in connection with embodiments, it will be apparent to those skilled in the art that modifications and variations can be made without departing from the spirit and scope of the present inventive concept as defined by the appended claims.

BRIEF DESCRIPTION OF THE DRAWINGS

The above and other aspects, features and other advantages will be more clearly understood from the following detailed description taken in conjunction with the accompanying drawings, in which.

DETAILED DESCRIPTION OF THE INVENTION

Figure 1:
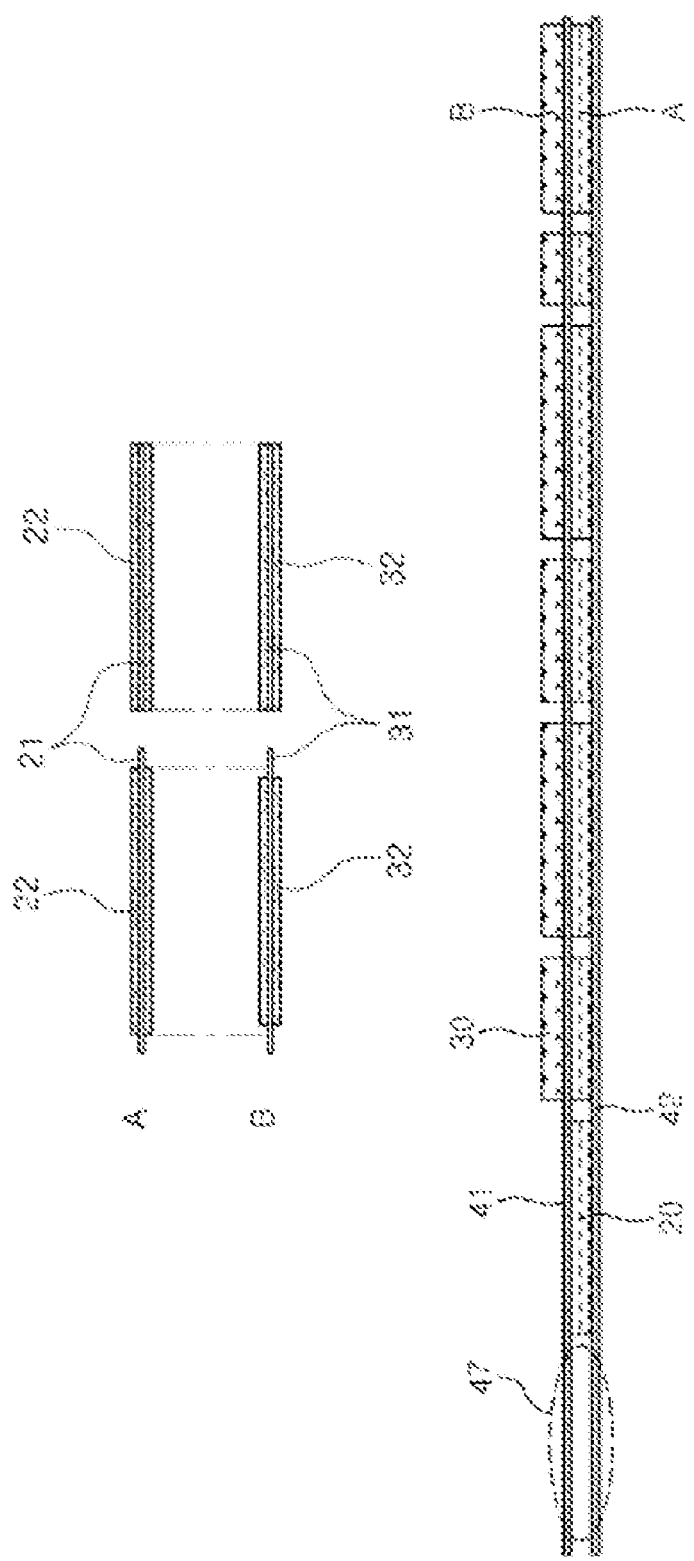
FIG. 1 is a development view of an expanded state of electrode units arrayed on two rectangularly shaped separation films to assemble an electrode assembly having a step according to an embodiment of the inventive concept.

Hereinafter, embodiments will be described in detail with reference to the accompanying drawings. Embodiments may, however, be embodied in many different forms and should not be construed as being limited to embodiments set forth herein. Rather, these embodiments are provided so that this disclosure will be thorough and complete, and will fully convey the scope of the inventive concept to those skilled in the art. In the drawings, the shapes and dimensions of elements may be exaggerated for clarity.

According to an embodiment of the inventive concept, an electrode assembly having a step may be provided. In detail, an electrode assembly including an electrode laminate having a step may be provided by folding electrode units having different areas using at least two rectangularly shaped separation films so as to allow a cathode and an anode to be stacked on each other, having a separation film interposed therebetween.

Figure 3:
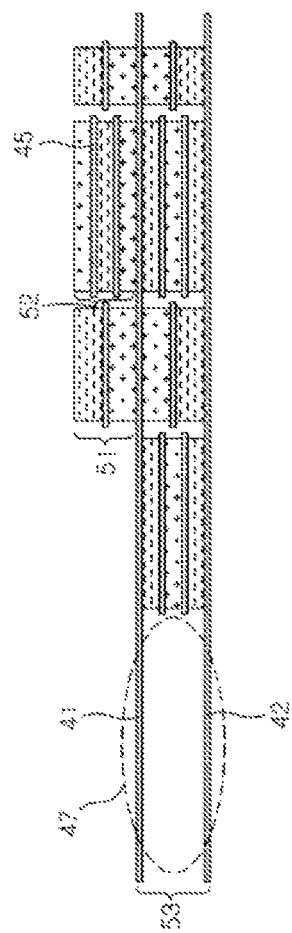
FIG. 3 is a development view illustrating electrode units arrayed on two rectangularly shaped separation films to assemble an electrode assembly having a step according to an embodiment of the inventive concept.
Figure 5:
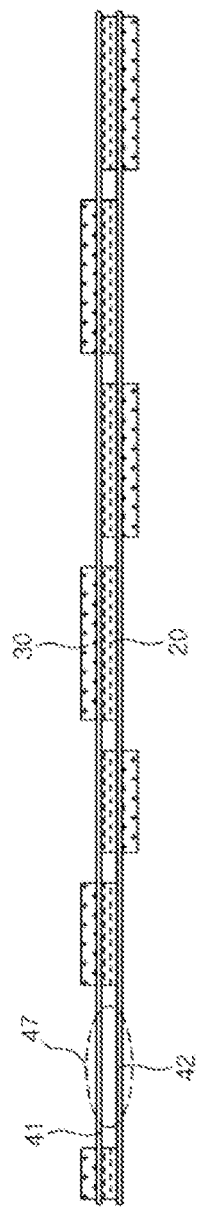
FIG. 5 is a development view illustrating electrode units arrayed on two rectangularly shaped separation films to assemble an electrode assembly having a step according to an embodiment of the inventive concept.

According to the embodiment, the rectangularly shaped separation films may be such as insulating separation films respectively disposed on both surfaces of a cathode and an anode to insulate the cathode from the anode, and for example, may be separation films having a length able to include and fold at least two electrode units arrayed thereon while encompassing the electrode units as schematically illustrated in FIGS. 3 and 5. A separation film used in embodiments of the inventive concept as well as the rectangularly shaped separation film described above may include separation films having a size able to cover one surface of a unit electrode, that is, one surface of an electrode covered with an electrode active material.

Although not particularly limited, the separation film may be formed using a multilayer film produced through polypropylene or polyethylene having a microporous structure, or a combination thereof, or a polymer film for a solid polymer electrolyte or a gel type polymer electrolyte such as polyvinylidene fluoride, polyethylene oxide, polyacrylonitrile or polyvinylidene fluoride hexafluoropropylene copolymer.

Figure 2:
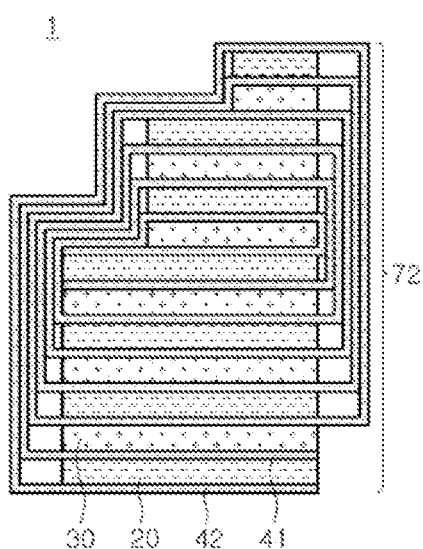
FIG. 2 is a cross-sectional view of a stacked and folded type electrode assembly assembled by folding the electrode units developed as illustrated in FIG. 1 in a winding manner.
Figure 4:
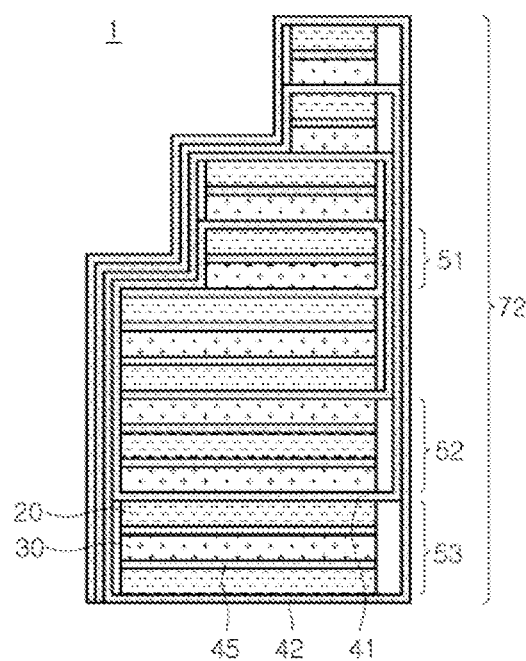
FIG. 4 is a cross-sectional view of a stacked and folded type electrode assembly assembled by folding the electrode units developed as illustrated in FIG. 3 in a winding manner.
Figure 6:
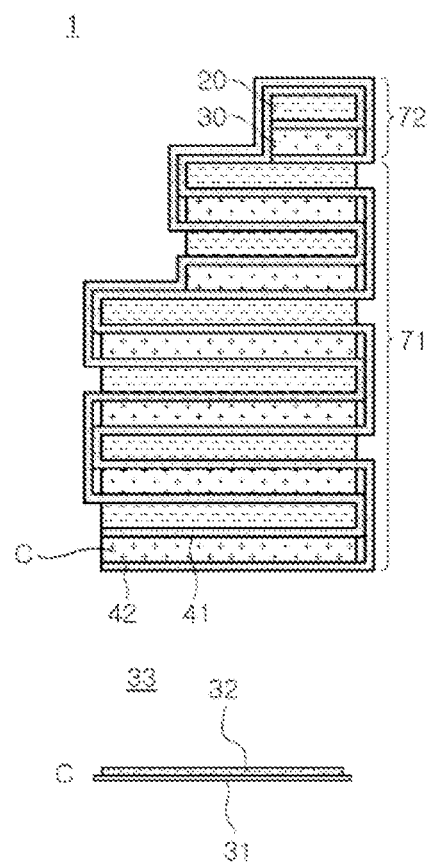
FIG. 6 is a cross-sectional view of a stacked and folded type electrode assembly assembled by folding the electrode units developed as illustrated in FIG. 5 in a combined Z-folding and winding manner.

The folding described above refers to the stacked and folded scheme in which the rectangularly shaped separation film is folded so as to stack electrode units on each other while encompassing the electrode units arrayed thereon. In this case, the rectangularly shaped separation film may be folded to coincide with a width of the electrode unit and may be larger than a width of the electrode unit. On the other hand, the folding may be performed using a winding type scheme of folding a separation film in a single direction as shown in FIGS. 2 and 4, and may be performed by combining the winding type scheme and a Z-folding type scheme as shown in FIG. 6. In addition, a Z-folding type scheme in which the folding is performed in a zigzag direction, such as a screen folding type scheme, may be used as illustrated in a laminate 71 of FIG. 10.

In addition, the stacking as described above refers that one surface of an electrode coated with an electrode active material in one electrode unit and one surface of an electrode coated with an electrode active material in another electrode unit face each other, having a separation film as a boundary therebetween, such that the electrode unit includes a plurality of layers therein. In this case, the stacking may be a stacking between unit electrodes such as a cathode and an anode, may be a stacking between a unit cell and a unit cell stacked on each other, that is, in a scheme in which at least one cathode and at least one anode are stacked with a boundary of a separation film therebetween, or may be a stacking of a unit electrode and a unit cell.

Meanwhile, for convenience of explanation, a surface on which an electrode unit is stacked or is to be stacked is defined as a stacking surface or a surface, and here, electrodes facing each other between two stacking surfaces are defined as facing electrodes. Further, the stacking as described above may be defined as an electrode laminate. The electrode laminate as above may be used as an electrode assembly as it is and may also be stacked on another electrode laminate or an electrode unit to obtain an electrode assembly.

The electrode assembly according to an embodiment may be formed in a scheme in which a cathode and an anode are cross-stacked on each other such that surfaces coated with respective cathode and anode electrode active materials face each other, having a separation film as a boundary therebetween. In this case, the cathode and the anode are provided with separation films formed on both surfaces thereof, respectively. Hereinafter, in describing an electrode assembly or an electrode laminate according to an embodiment of the inventive concept, unless explicitly described otherwise, the respective electrodes should be understood as including separation films provided on both surfaces thereof. Therefore, according to an embodiment of the inventive concept, all stacking surfaces of the electrodes forming an electrode assembly are provided with separation films, and thus, are not directly exposed to the outside.

An electrode assembly having a step according to an embodiment may include an electrode laminate in which a plurality of electrode units are rolled up in at least two rectangularly shaped separation films to be stacked on each other. An upper surface and a lower surface of the respective electrode unit are provided with at least one of the at least two rectangularly shaped separation films. The rectangularly shaped separation film provided on one surface of the electrode unit may be different from a rectangularly shaped separation film disposed on another surface thereof. The electrode laminate may include at least one step formed by stacking an electrode unit having a difference in area from an electrode unit adjacent thereto by a boundary of one of the rectangularly shaped separation films, thereon.

Therefore, although not particularly limited, as illustrated in the development views of FIGS. 1, 3 and 5, the at least two rectangularly shaped separation films 41 and 42 are stacked on each other, electrode units are arrayed on one surface or both surfaces of the respective rectangularly shaped separation films 41 and 42, and then, the respective electrode units are folded while encompassing the respective electrode units by the rectangularly shaped separation films 41 and 42, thereby obtaining an electrode laminate in which a cathode 20 and an anode 30 are alternately stacked.

In the embodiment, the electrode units are arrayed on the rectangularly shaped separation film and folded such that as an individual unit forming an electrode laminate, the electrode units may be a respective unit electrodes of a cathode and an anode and may be a unit cell in which unit electrodes of at least one cathode and at least one anode are stacked, having a separation film as a boundary therebetween, so as to generate a battery reaction. Here, the electrode unit disposed on one surface or the electrode units disposed on both surfaces of the rectangularly shaped separation film may be the same or different.

Although the drawing according an embodiment of the inventive concept illustrates the case in an electrode assembly is manufactured to have a step by using and folding two rectangularly shaped separation films for convenience of illustration, it should be understood that an electrode assembly may be assembled by arraying electrode units on three or more rectangularly shaped separation films.

As illustrated in FIGS. 1 and 5, unit electrodes of the cathode 20 and the anode 30 are respectively arrayed on one surface or both surfaces of the two rectangularly shaped separation films 41 and 42, and the respective electrodes are encompassed by the rectangularly shaped separation films to be folded, thereby obtaining the electrode assembly 1 as illustrated in FIGS. 2 and 6.

In this case, the cathode and the anode are not particularly limited and any generally used electrode may be appropriately applied to the embodiments of the inventive concept.

For example, although not particularly limited, the cathode may be formed by coating one surface or both surfaces of a cathode current collector produced using copper (Cu), Nickel (Ni), a copper alloy or a combination thereof with one or more cathode active materials selected from a group consisting of a lithium metal, a lithium alloy, carbon, petroleum coke, activated carbon, graphite, a silicon compound, a tin compound, a titanium compound, alloys thereof, and combination thereof.

In addition, the anode may be formed by coating one surface or both surfaces of an anode current collector produced using aluminum (Al), Nickel (Ni), an alloy thereof or a combination thereof with an anode active material such as a lithium manganese oxide, a lithium cobalt oxide, a lithium manganese cobalt oxide, a lithium nickel oxide, a combination thereof, a composite oxide thereof, or the like.

Here, as shown in A and B of FIG. 1, in the electrode units having the same area as each other, the electrode current collectors 21 and 31 may generally have the same size as the current collectors 21 and 31 of the cathode and the anode. On the other hand, although not particularly limited, electrode active materials 22 and 32 may be coated on the entire surfaces of the current collectors 21 and 31, and in this case, both electrodes 20 and 30 may have the same size.

However, in this case, lithium contained in the anode active material may be precipitated during a battery reaction, thereby degrading battery performance. Therefore, in some cases, a distal end portion of the current collector may not be coated, and in this case, an area of the cathode active material 22 coated on the cathode current collector 21 may be larger than that of the anode active material 32 coated on the anode current collector 31. Thus, lithium may be prevented from being precipitated from the anode active material 32.

In the case of the respective electrodes, the electrode active materials coated on the electrode current collectors may have the same amount of load or different amounts of load thereon. By differentiating load amounts of the electrode active materials, thicknesses of the electrodes may be different. According to some cases, in a single electrode, load amounts of the electrode active material may be different on both surfaces of the electrode so as to be asymmetrically coated thereon. Further, as shown in C of FIG. 6, the electrode may be a single surface coated electrode in which one surface thereof is an electrode maintenance part coated with an electrode active material and the other surface thereof is an uncoated part without being coated with an electrode active material. Although C of FIG. 6 illustrates a single surface coated anode 33, the cathode may also be a single surface coated cathode as described above. Such a single surface coated electrode may be suitable for use as an outermost electrode of the electrode assembly.

On the other hand, the electrode laminate having a step according to an embodiment may be obtained by arraying unit cells on at least two rectangularly shaped separation films and folding the rectangularly shaped separation films to encompass the unit cells. The unit cell may be a stacked type unit cell, a laminated and stacked type unit cell, a stacked and folded type unit cell, a jelly-roll type unit cell, or the like, but should not be considered to be limited thereto.

The respective unit cell may be a unit cell formed by alternately stacking at least one anode and at least one cathode, having a separation film as a boundary therebetween, and may be, for example, a laminate having a structure such as in a structure of an anode/a separation film/a cathode stacked therein or may be a laminate having a structure in which electrodes disposed on both surfaces have the same polarity as each other, such as in a structure of an anode/a separation film/a cathode/a separation film/an anode/a separation film/a cathode stacked therein, but should not be considered to be limited thereto. in addition, the unit cell may be a laminate in which a cathode and an anode are separated from each other, having a separation film as a boundary therebetween, and anodes are disposed on both surfaces, such as in a structure of an anode/a separation film/a cathode/a separation film/an anode or an anode/a separation film/a cathode/a separation film/an anode/a cathode/a separation film/an anode. Further, the unit cell may be a laminate in which a cathode and an anode are separated from each other, having a separation film as a boundary therebetween, and cathodes are disposed on both surfaces, such as in a structure of a cathode/a separation film/an anode/a separation film/a cathode or a cathode/a separation film/an anode/a separation film/a cathode/a separation film/ an anode/a separation film/a cathode, or the like. Among the unit cells as described above, an example using a stacked type unit cell is illustrated in the development view of FIG. 3 and the electrode assembly of FIG. 4.

In addition, in an embodiment of the inventive concept, the stacked type unit cell should be understood to include an electrode laminate manufactured in a scheme in which at least one anode, at least one cathode and at least one separation film are laminated to form a cell having a basic structure after which the cells having the basic structure are stacked (hereinafter, referred to as 'laminated and stacked scheme') as well as an electrode laminate manufactured using a typical scheme as described above.

When an electrode laminate is manufactured in the laminated and stacked scheme, any cell having the basic structure as described above including at least one anode, at least one cathode and at least one separation film may be used and the configuration thereof is not particularly limited.

However, when the electrode laminate is manufactured in the laminated and stacked scheme, the unit cell may have a basic structure configured of a cathode/a separation film/an anode/a separation film or a separation film/a cathode/a separation film/an anode, in terms of process simplicity and economic feasibility. Here, the laminated and stacked type unit cell may have one or a plurality of basic structures.

Meanwhile, the electrode laminate manufactured in the laminated and stacked scheme may only be configured of an electrode unit including the basic structure as described above and may also be configured by combining an electrode unit having the basic structure with an electrode unit having a different structure.

Figure 11:
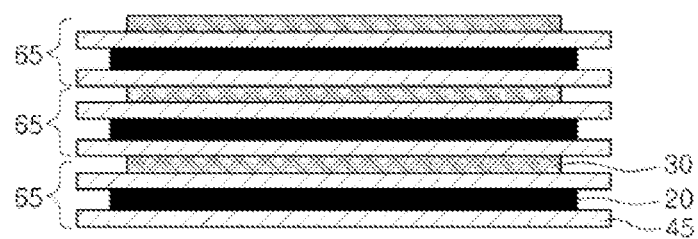
FIGS. 11 to 13 schematically illustrate examples of laminated and stacked type unit cells used as unit cells according to an embodiment.
Figure 12:
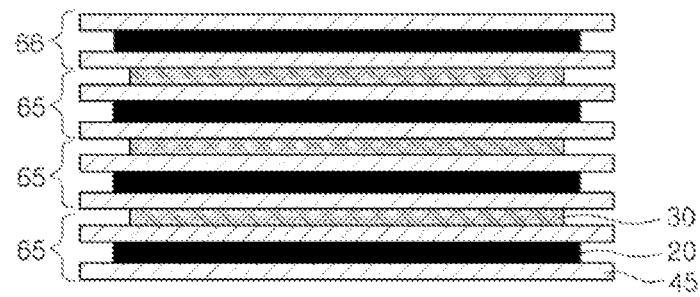
Figure 13:
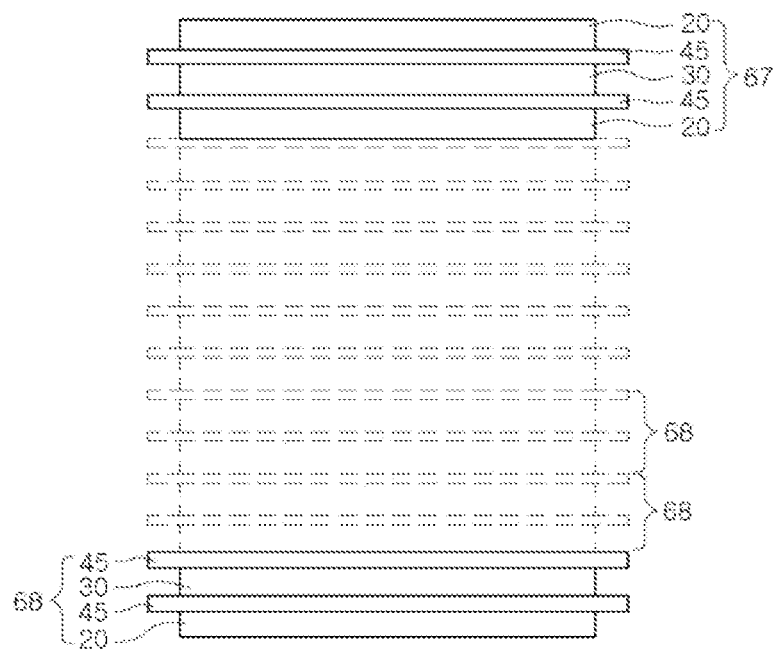

FIGS. 11 to 13 illustrate various examples of electrode laminates manufactured using the laminated and stacked scheme.

FIG. 11 illustrates an electrode laminate manufactured in the laminated and stacked scheme, configured of electrode units 65 having a basic structure of a separation film 45/a cathode 20/a separation film 45/an anode 30. In FIG. 11, although the basic structure having a separation film/a cathode/a separation film/an anode is illustrated, a basic structure of a separation film/an anode/a separation film/a cathode provided by changing locations in which the anode and the cathode are positioned may also be used. Meanwhile, as shown in FIG. 11, when the basic structure of the electrode unit is the structure including a separation film/a cathode/a separation film/an anode, the anode is exposed without a separation film on an outermost portion of the electrode laminate in a thickness direction of the electrode assembly. In a case in which such a basic structure is used, the anode exposed to the outermost portion in the thickness direction may be a single surface coated anode of which an exposed surface is not coated with an active material, used at the time of designing an electrode in consideration of capacity and the like. On the other hand, although FIG. 11 illustrates the case in which the electrode units have a single basic structure, the inventive concept should not be considered to be limiting. For example, a structure in which two or more basic structures are repeatedly stacked on each other may also be used as a single electrode unit.

FIG. 12 illustrates a laminated and stacked-type electrode laminate in which electrode units 65 having a basic structure of the separation film 45/the cathode 20/the separation film 45/the anode 30 and an electrode unit 66 having a structure of the separation film 45/the cathode 20/the separation film 45 are stacked on each other. As illustrated in FIG. 12, when the electrode unit having the structure of the separation film 45/the cathode 20/the separation film 45 is stacked on an outermost surface in the thickness direction of an electrode assembly, electrical capacitance may be increased while preventing the anode 30 from being exposed to the outside. In similar manner to the description above, in the case of an array in which a cathode is located on an outermost portion of an electrode body in the thickness direction of the electrode assembly, an electrode unit having a structure of a separation film/an anode/a separation film may be stacked on an upper part thereof. This case may exhibit an advantage in that a cathode capacity may be significantly used.

FIG. 13 illustrates an electrode laminate in which electrode units 68 having a basic structure of a cathode 20/a separation film 45/an anode 30/a separation film 45 and an electrode unit 67 having a structure of a cathode 20/a separation film 45/an anode 30/a separation film 45/a cathode 20 are stacked on each other. As illustrated in FIG. 13, when the electrode unit 67 having the structure of the cathode 20/the separation film 45/the anode 30/the separation film 45/the cathode 20 is stacked on an outermost portion of the electrode laminate in a thickness direction of an electrode assembly, electrical capacitance may be increased while preventing the anode from being exposed to the outside.

As illustrated in FIGS. 12 and 13, the electrode laminates manufactured using the laminated and stacked scheme may be formed by combining a single electrode, a separation film, or unit cells having arrays and configurations different from those of the above-mentioned electrode units, together with the electrode units having the basic structure as described above. Specifically, when the electrode units having the basic structure are stacked on one another, in the light of at least one of preventing an anode from being exposed to the outside and increasing battery capacity, a single electrode, a single surface coated electrode, a separation film or unit cells having arrays and configurations different from those of the electrode units described above may be disposed on at least one selected from one outermost surface and both outermost surfaces of the electrode laminate in a thickness direction thereof. On the other hand, FIGS. 12 and 13 illustrate that the electrode unit having a different structure is stacked on the electrode laminate, but should not be considered to be limited thereto. For example, an electrode unit having a different structure may also be stacked below the electrode laminate, and electrode units having different structures may also be stacked on both of upper and lower parts thereof, as needed.

Meanwhile, a stacked and folded type unit cell according to an embodiment of the present inventive concept may be a unit cell obtained by folding at least two electrode units arrayed on at least one or two rectangularly shaped separation films in a stacked and folded manner such as a winding scheme, a Z-folding scheme or the like. Although not shown in the drawing, the electrode units arrayed on the rectangularly shaped separation films may be a stacked type electrode laminate, a laminated and stacked electrode laminate, a jelly-roll type electrode laminate, or a stacked and folded electrode laminate, and may also be a combination thereof.

The unit cell may be a unit cell in which electrode units having the same area are stacked on each other, and may also be a unit cell in which electrode units having a difference in area are stacked to have a step. When the unit cell in which electrode units having the same area are stacked on each other is used, the electrode units having the same area may be stacked, while the unit cell having an area different from that of a unit cell adjacent thereto may be stacked, thereby forming a step, and the unit cell may be stacked by being combined with the unit cell having the step, to thereby have the step thereon.

In the embodiment, the stacked type unit cell, the laminated and stacked unit cell, the stacked and folded unit cell and the jelly-roll type unit cell may be separately arrayed or arrayed to be combined on the rectangularly shaped separation film, such that the electrode laminates according to the embodiment may be assembled. In addition, an electrode assembly may be assembled by arraying single units on the rectangularly shaped separation film together with the unit cell as described above.

The sequence in which the electrode units are arrayed on the rectangularly shaped separation film is not particularly limited, but the electrode units may be arrayed such that a cathode and an anode are alternately stacked on each other in an electrode laminate obtained by folding the rectangularly shaped separation film. By alternately stacking the cathode and the anode, a battery reaction may occur on a stacking surface on which the cathode and the anode face each other, having a separation film as a boundary therebetween.

In this case, upper and lower surfaces of the respective electrode units of the electrode laminate may be separated from those of electrode units adjacent thereto by the rectangularly shaped separation film. For example, when the electrode laminate is formed using two rectangularly shaped separation films as shown in FIGS. 1, 3 and 5, one first separation film may be located on an upper stacking surface of one electrode unit in a stacking direction of the electrode assembly 1 (or the electrode laminates 71 and 72) as shown in FIGS. 2, 4 and 6, and another second separation film may be located on a lower stacking surface, so as to be separated from the adjacently stacked electrode unit. The same separation film may be located on both surfaces of one electrode unit depending on a form in which the electrode units are arrayed on the rectangularly shaped separation film. In this case, at least different rectangularly shaped separation films may be simultaneously positioned such that different rectangularly shaped separation films are present on upper and lower surfaces of one electrode unit.

In addition, the plurality of rectangularly shaped separation films may have the same length, as shown in FIGS. 1, 3 and 5, to allow for the simultaneous folding thereof at the time of folding, and although not shown in the drawing, the lengths thereof may be different to allow for the folding thereof.

Meanwhile, according to a manner in which the electrode units are arrayed on the rectangularly shaped separation film, for example, the electrode units may be stacked without being encompassed by the rectangularly shaped separation film at the time of an initial folding. In this case, a problem in that the electrode unit is stacked on an electrode unit adjacent thereto without being separated by the separation film may occur. In order to prevent such a defect, a space region 47 in which the electrode units are not arrayed on the rectangularly shaped separation films 41 and 42 may be included to cover an initially folded electrode unit as shown in FIGS. 1, 3 and 5.

The space region 47 in which the electrode unit is not disposed at initial positions of the rectangularly shaped separation films 41 and 42 may be provided as shown in FIGS. 1 and 3 such that the electrode unit may be stacked on an electrode unit adjacent thereto at the boundary of a separation film by performing the folding thereof after previously covering the electrode unit. In addition, a predetermined space region 47 may be formed between the initially folded electrode unit and an electrode unit adjacent thereto as shown in FIG. 5 such that the initially folded electrode unit is folded without being stacked on the electrode unit adjacent thereto, thereby preventing electrode stacking surfaces from directly facing one another and being stacked on each other without having the separation films 41 and 42 interposed therebetween.

In addition, although not shown in the drawing, when the space region as described above is not applied, a separate separation film for separation between an electrode and an electrode may be interposed between the electrode and the electrode at an interface therebetween.

The electrode laminate according to the embodiment may include at least one step, and the step may be formed by adjacently stacking at least one electrode unit and an electrode unit having a difference in area therefrom on each other. Such a step may be appropriately formed according to a battery shape to be required thereby.

The difference in area in the electrode units refers that in one electrode unit and an electrode unit adjacent thereto, one of a length and a width thereof has a different structure to have a different area.

For example, in an embodiment, an electrode assembly may be obtained by stacking electrode units having different lengths or different widths. The difference in the sizes of the electrode units is not particularly limited as long as electrode units are stacked to be able to form an electrode assembly having a step, and for example, the length or width of a relatively small electrode unit may be 20% to 95% of a width or length of a relatively large electrode unit, and specifically, may range from 30 to 90% thereof. The electrode units may have a structure in which one of the widths and lengths thereof may be different or both thereof may be different.

In the electrode laminate, at an interface at which one electrode unit and an electrode unit adjacent hereto having a difference in area face each other to form a step, electrodes having different polarities may face each other, having a separation film as a boundary therebetween. As such, by allowing the electrodes having different polarities to face each other, a battery reaction may also be obtained in the interface at which the step is formed, thereby increasing a battery capacity.

In this case, in the case of the facing electrodes at the interface, forming the step, an electrode facing an electrode unit having a relatively large area may be disposed to be a cathode. That is, when electrode units having different areas face each other with a separation film as a boundary therebetween in an electrode laminate, a portion of a stacking surface of an electrode unit having a relatively large area may be directed toward the outside. In this case, when the electrode of the electrode unit directed toward the outside is an anode, lithium included in an anode active material of an anode surface may be precipitated from the anode surface such that battery life may be shortened or battery stability may be deteriorated.

For the same reason as described above, as shown in FIGS. 2 and 4 and FIGS. 7 to 10, in the electrode assembly 1 obtained by stacking the electrode units on one another, the electrode units may be disposed such that the cathodes 20 are located on both surfaces of uppermost and lowermost parts of the electrode assembly 1 in the thickness direction thereof. In addition, as shown in FIG. 6, besides the cathode 20, the anode 30 may be disposed on at least one surface of both surfaces of the electrode assembly 1, but in this case, the anode 30 may be a single surface coated anode 33 having an uncoated surface on which the anode active material 32 is not coated on a surface directed toward the outside as shown in C of FIG. 6.

Figure 7:
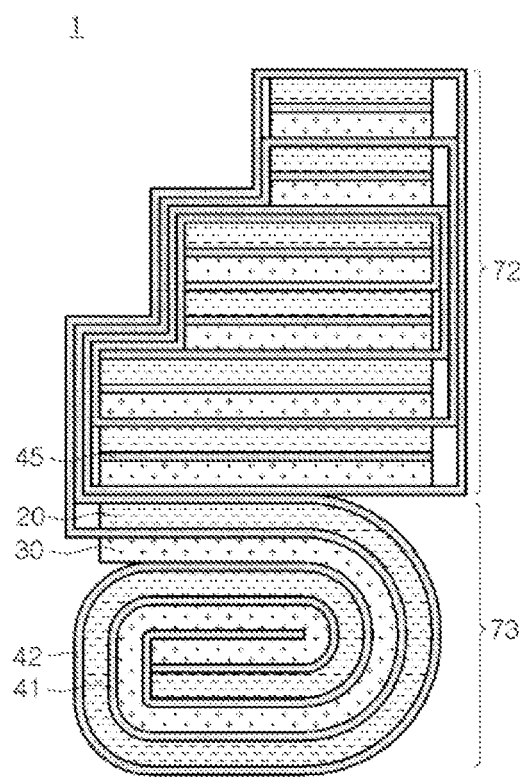
FIG. 7 illustrates an electrode assembly assembled by continuously forming a jelly-roll type electrode laminate and a winding-type electrode laminate, using two rectangularly shaped separation films, according to an embodiment.

In the electrode laminate according to an embodiment, as shown in FIGS. 6 and 7, the respective electrode units arrayed on the at least two rectangularly shaped separation films 41 and 42 may be folded in at least two folded forms, thereby forming electrode laminates 71, 72 and 73. FIG. 6 illustrates an example of the electrode assembly 1 formed by stacking electrode units using the Z-folding scheme in a portion of the electrode assembly (71) and folding electrode units using the winding scheme in a portion of the electrode assembly (72). That is, the electrode laminate of FIG. 6 provides the stacked and folded type electrode laminates 71 and 72 formed by combining the Z-folding scheme and the winding scheme through the same, with at least two rectangularly shaped separation films 41 and 42.

In addition, FIG. 7 illustrates an example of an electrode laminate including a winding-type stacked and folded electrode laminate 72 formed by folding electrode units in a winding scheme to be stacked on each other and a jelly-roll type electrode laminate 73 formed by folding electrode units in a jelly-roll scheme to be stacked on each other. That is, the electrode laminate of FIG. 7 provides the electrode laminates 72 and 73 formed by combining the stacked and folded scheme and the jelly-roll scheme through the same, at least two rectangularly shaped separation films 41 and 42.

As an electrode laminate separate from the electrode laminate having a step according to the embodiment of the inventive concept, a stacked and folded type electrode laminate, a stacked type electrode laminate, a laminated and stacked type electrode laminate, and a jelly-roll type electrode laminate may also be used by being combined and assembled with each other. In this case, a single electrode may also be stacked to form the electrode assembly. Here, respective laminates stacked on the electrode laminate having the step according to the embodiment may have the electrode units having the same area to be stacked on one another, and may have a step formed through stacking electrode units having different areas therebetween.

Figure 8:
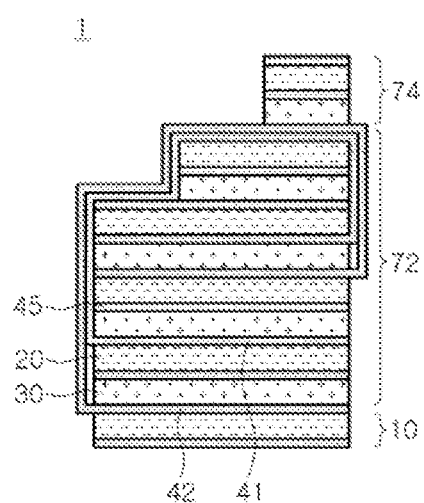
FIG. 8 is a cross-sectional view of an electrode assembly including an electrode laminate and a stacked-type electrode laminate stacked on each other therein according to an embodiment.
Figure 9:
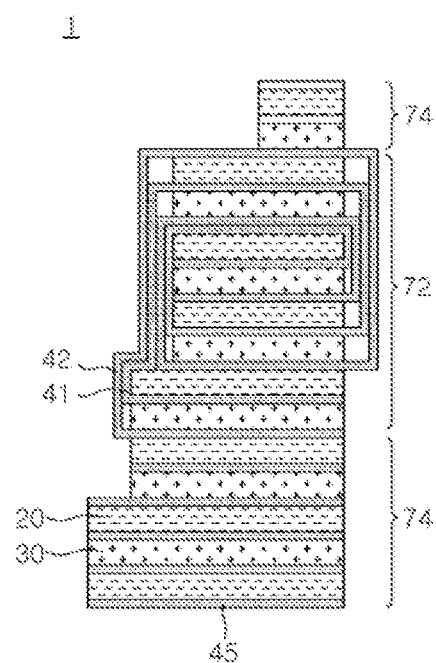
FIG. 9 illustrates an electrode assembly assembled by continuously forming a Z-folding type electrode laminate and a winding-type electrode laminate, using two rectangularly shaped separation films, according to an embodiment.

For example, FIG. 8 illustrates an example of an electrode assembly 1 formed by stacking a stacked type electrode laminate 74 on an upper part of the winding-type stacked and a folded electrode laminate 72 having the step according to the embodiment and stacking a single electrode 10 on a lower part thereof. In addition, FIG. 9 illustrates an example of an electrode assembly 1 formed by stacking the stacked type electrode laminate 74 on an upper part of the winding-type stacked and folded electrode laminate 72 having the step according to the embodiment and stacking the stacked type electrode laminate 74 having the step on a lower part thereof. Further, FIG. 10 illustrates an example of an electrode assembly 1 having a step by stacking the electrode laminate 72 having the step according to the embodiment, the single electrode 10 and the Z-folding type electrode laminate 71 having a step on one another.

Figure 10:
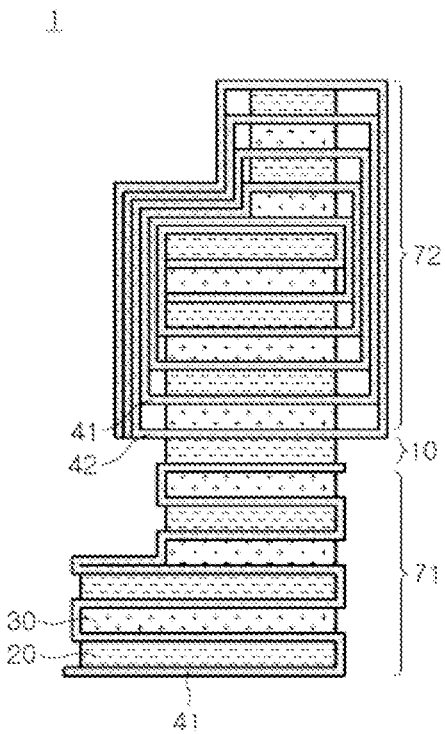
FIG. 10 is a cross-sectional view of an electrode assembly according to an embodiment, formed by stacking a winding-type stacked and folded electrode laminate, a Z-folding type stacked and folded laminate and a single electrode on one another.

The single electrode 10 included in the electrode assembly 1 shown in FIGS. 8 and 10 may be disposed as an outermost electrode of the electrode assembly 1 in the thickness direction thereof as shown in FIG. 8, and may also be disposed inside the electrode assembly 1 as shown in FIG. 10, and that is, may be disposed between the electrode laminate and the electrode laminate.

As shown in FIG. 8, in a case in which the anode 30 is disposed as an outermost electrode of the electrode assembly 1 in the thickness direction of the electrode assembly, when the single electrode 10 of the cathode 20 is additionally stacked thereon, an outermost electrode may be a cathode, such that a defect due to precipitation of lithium from the anode 30 may be solved. Further, the single surface coated anode may be used as a single electrode 10 so as to be stacked on a stacking surface of the cathode 20.

In addition, as shown in FIG. 10, when facing electrodes between the electrode laminates 71 and 72 stacked on each other have the same polarity, the single electrode 10 having a different polarity may be interposed between the electrode laminates 71 and 72 to be stacked on each other. By inserting such a single electrode 10 therebetween, different polarities may be disposed on both surfaces of the stacked signal electrode 10 to promote a battery reaction.

In the embodiment, in the case of the electrode laminate at a respective stage thereof forming a step, the number of stacked electrode units is not particularly limited. Further, a height of the electrode laminate is not particularly limited. Thus, the electrode laminates may have the same height or different heights, according to a respective electrode laminate.

Meanwhile, as described above, as illustrated in FIG. 3, respective electrode units forming a respective electrode laminate may be electrode units having the same thickness, and specifically, may have electrodes having the same thickness, between laminates as well as in a single laminate, while electrodes having different thicknesses may be stacked to form a respective electrode unit laminate. For example, in order to form a step, in the case of an electrode unit having a relatively small area, a reduction in battery capacity due to a reduced area may be offset by increasing a load amount of electrode active material.

However, the inventive concept is not necessarily limited to the description above, and a thickness of an electrode unit having a relatively large area may be increased as needed, and the thickness thereof may also be reduced. In this case, the thickness of the electrode unit may be appropriately selected in consideration of a battery shape and height, a battery capacity required in devices to which a manufactured battery is to be applied, and thus, is not limited thereto.

Figure 14A:
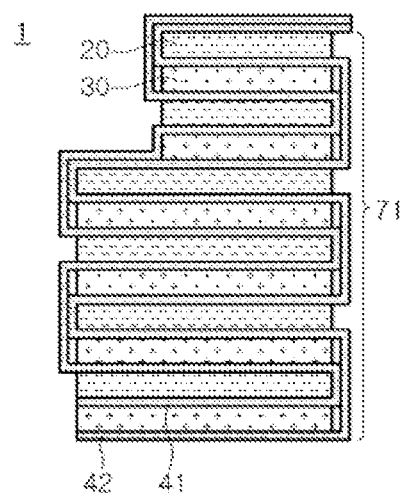
FIGS. 14A to 14C schematically illustrate examples of an electrode assembly having a single step according to an embodiment.
Figure 14B:
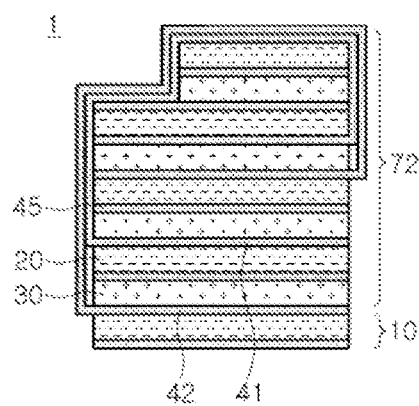
Figure 14C:
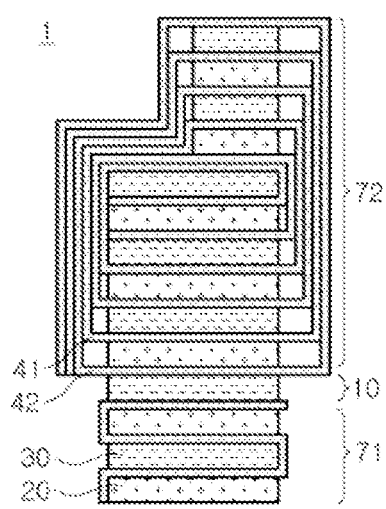

Although the drawing in which the electrode assembly having two steps is illustrated above by way of example, the electrode assembly according to the embodiment may have a single step formed by stacking two electrode laminates as described above. An example thereof is illustrated in the electrode assembly of FIG. 14.

Figure 15A:
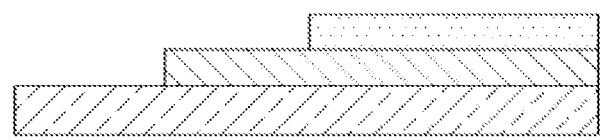
FIGS. 15A to 15c are schematic cross-sectional views of an electrode assembly having a step obtained according to an embodiment of the inventive concept.
Figure 15B:
Figure 15C:
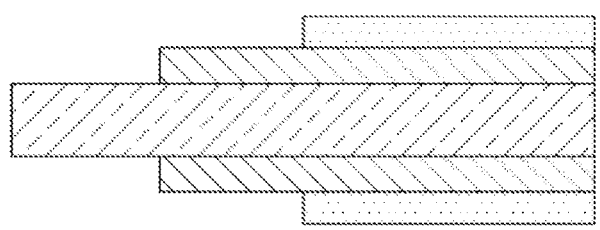

The electrode assembly according to an embodiment may include various stacking structures. FIG. 15 schematically illustrates a cross section of the electrode assembly having a step. As can be seen from FIG. 15, the size of the electrode units may be reduced in a stacking direction of the electrode unit, that is, a height direction as shown in FIG. 15A, and the electrode units may also be stacked to be increased in the size thereof as shown in FIG. 15B. In addition, the electrode units may be stacked such that the size thereof is increased and then reduced in a stacking direction as shown in FIG. 15C, and may also be stacked to have areas reduced and then increased in the stacking direction. Such stacking forms may be applied to be symmetrical, upwardly and downwardly, and may also have an uneven pattern in the stacking form.

Figure 16:
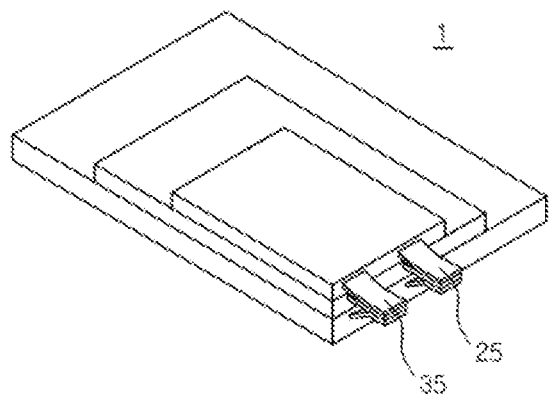
FIGS. 16 to 22 are perspective views of battery cells having steps provided according to various embodiments of the inventive concept.
Figure 17:
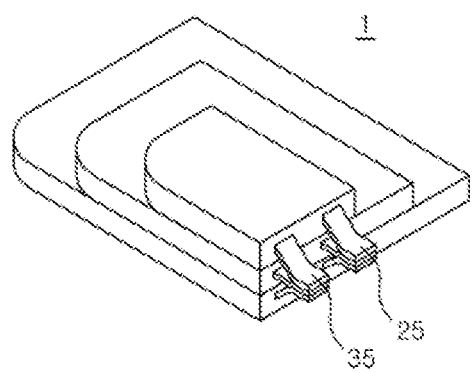
Figure 18:
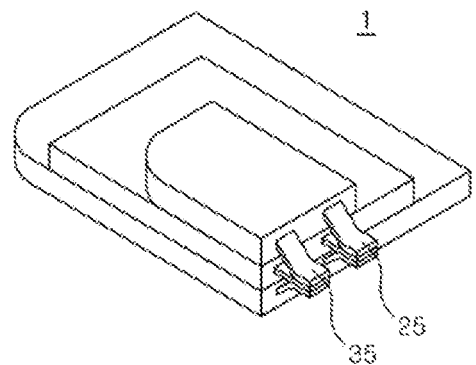
Figure 19:
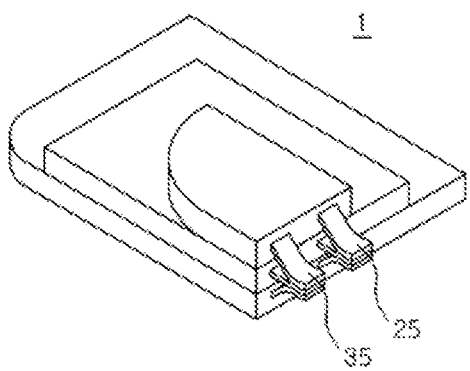
Figure 20:
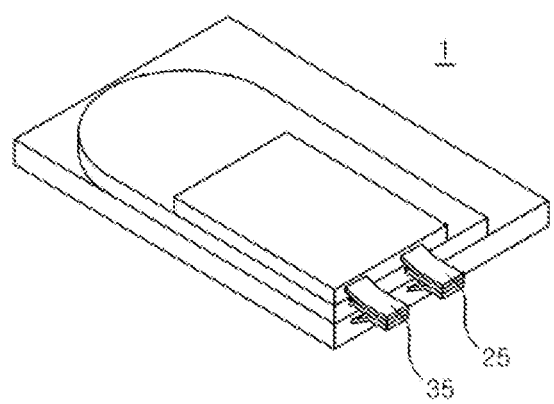

In addition, for example, as illustrated in FIGS. 16 to 20, electrode units may be stacked such that one corner portions coincide with each other, thereby obtaining an electrode assembly. In this case, the electrode units may have different areas but may have the same shape as shown in FIG. 16 or FIG. 17, and may have different areas and shapes as shown in FIGS. 18 to 20. For example, as shown in FIGS. 17 and 20, at least one electrode unit may have a rounded corner portion, and such a rounded corner portion may be formed in two in a single electrode unit. Although the shape of the corner portion as described above is illustrated as a round shape, various shapes may be applied and will be applied equally below.

Here, as shown in FIG. 18, curvatures of rounded corner portions may be different from each other. In addition, as illustrated in FIG. 19, the shapes of the corner portions may be different. On the other hand, one side and two corner portions adjacent to the side may have one rounded corner portion as shown in FIGS. 16 and 20.

Figure 24:
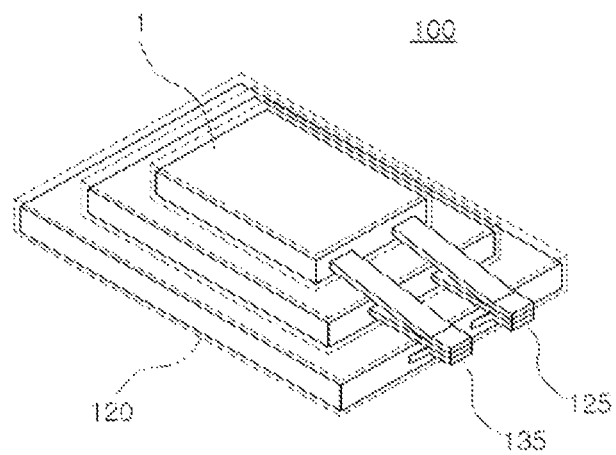
FIGS. 24 and 25 schematically illustrate pouch-type secondary batteries including an electrode assembly according to an embodiment of the inventive concept.

In addition, although not shown in the drawing, the electrode units may be stacked such that a relatively small electrode unit may be included on a surface of a relatively large electrode unit, and in this case, may be stacked without a uniform pattern formed therein. Further, the electrode units may be stacked to coincide with each other at a center of a surface, as shown in FIG. 24.

Figure 21:
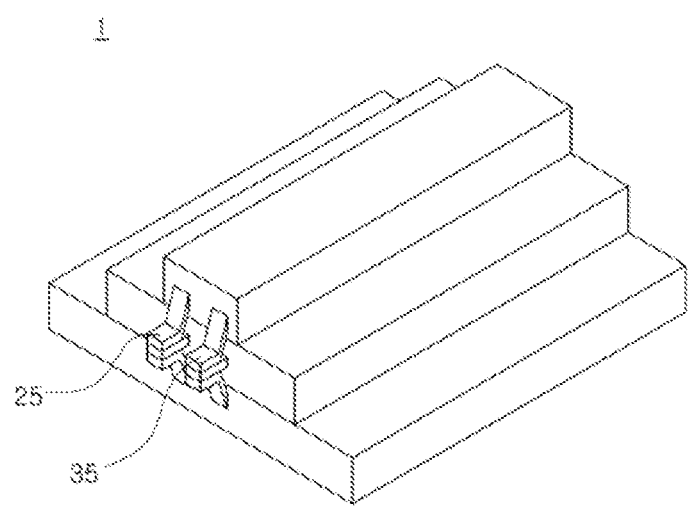
Figure 22:
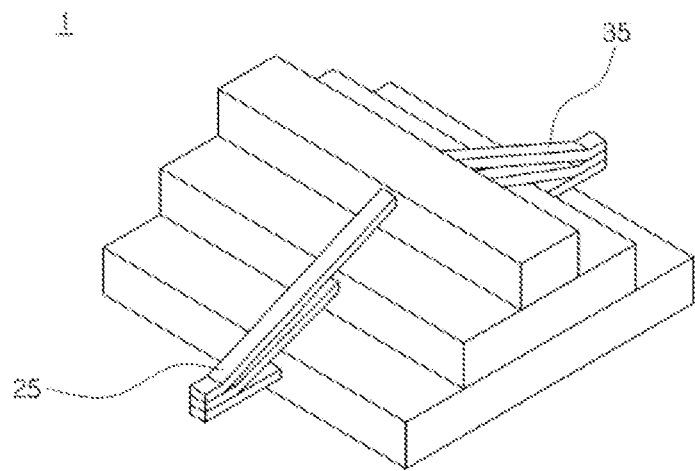

In addition, as shown in FIG. 21, the electrode units may have the same length in a length direction of the electrode assembly, and may have a step in a width direction thereof. Here, one step may be formed in a width direction of the electrode assembly or steps may be formed in both directions thereof. Further, the electrode assembly may have a step formed in a length direction thereof as shown in FIG. 22.

In addition to the form illustrated in the drawing as above, the electrode units according to an embodiment of the inventive concept may have corner portions having various shapes. As can be appreciated from the drawing as illustrated above, the electrode units may be stacked such that an electrode unit having a relatively small area may be included on a surface of an electrode unit having a relatively large area, and may also be stacked such that portions of contacting surfaces between facing electrodes may contact each other and portions thereof do not contact each other as in a crisscross (+) form.

As such, the stacking form of the electrode assembly, a shape of the electrode unit, a shape of the corner portion, or the like may be variously formed, thereby implementing various designs of batteries while improving space occupancy.

Further, in the electrode assembly according to an embodiment, the respective electrode units may include at least one of a cathode tab and an anode tab. When the electrode unit is a unit cell, a cathode tab and an anode tab may both be included in the electrode unit, and when the electrode unit is configured of separate electrodes, only one electrode tab may be included therein. The electrode tables may be inserted into a battery case and electrodes having the same polarity may then be electrically connected to each other.

A location in which the electrode tabs are attached may be variously selected. The electrode tabs of two polarities may be formed on one ends of the electrode units, and the electrode tabs may be stacked to be directed in a single direction. For example, electrode tabs 25 and 35 may be disposed to protrude on one side of the electrode assembly 1 as shown in FIGS. 16 to 21. Further, respective electrode tabs 25 and 35 may be protruded on two sides of the electrode assembly 1 as illustrated in FIG. 22.

However, in order to facilitate electrical connectivity of the electrode tabs after the insertion thereof into a battery case, the electrode units may be disposed such that electrodes having the same polarity may be overlapped with each other.

On the other hand, in the case of an electrode assembly formed to have a step having the form as illustrated in FIG. 22, when the electrode tabs 25 and 35 are adhered to sides of the electrode assembly 1 having a step, the electrode tabs 25 and 35 may contact an electrode unit having a relatively large area and may affect battery stability. Therefore, the electrode tabs 25 and 35 and the electrode units may be prevented from contacting each other, and in some cases, a surface of the electrode tabs 25 and 35 may be coated with an insulting resin or the like so as to block contact therebetween.

Figure 23A:
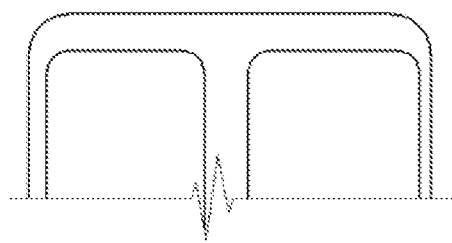
FIG. 23A is a plan view of an electrode tab and FIG. 23B is a front view of an electrode tab, illustrating forms in which electrode tabs are stacked on each other according to an embodiment.
Figure 23B:

The form of the electrode tabs is not particularly limited, and an area of the electrode tabs may also be variously formed. For example, the electrode tabs may have the same width or length, or may have at least one of different widths and lengths. As such, by using various sized electrode tabs, an electrode tab having a relatively small area may be arrayed on an electrode tab having a relatively large area to be stacked in line. As an example thereof, when electrode tabs having different areas are used, the electrode tabs 25 and 35 may be stacked in a stacking form as illustrated in FIG. 23.

Meanwhile, when an electrode assembly is configured by folding a portion of the electrode units or all electrode units using at least one rectangularly shaped separation film, the rectangularly shaped separation film may form an inclined surface by a step formed by an upper end of an electrode unit having a relatively large area and an upper end of an electrode unit having a relatively small area. The inclined surface as described above may be formed when a step is formed by the winding-type stacked and folded electrode assembly or an electrode assembly having a step formed therein is rolled up by a rectangularly shaped separation film.

In this case, a shape of an electrode case including an electrode assembly accommodated therein may be formed to coincide with the inclined surface of the separation film 45 as described above. In this case, since space may be occupied unnecessarily, the separation film may have the same shape as respective surfaces of the electrode assembly in terms of space occupancy. Therefore, when the separation film is spaced apart from the electrode assembly, the separation film may be heated or compressed to be elongated such that the shape thereof may be identical to that of the electrode assembly. Here, a curved portion may be formed in a portion having a step, and in addition, the separation film may be cut at a portion having the step so as to have the same shape as that of a respective surface of the electrode assembly.

Figure 25:
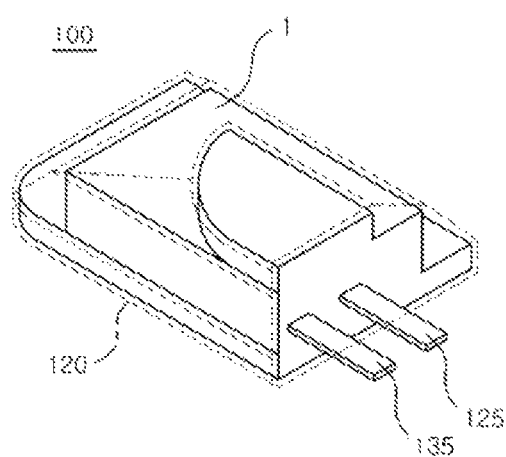

Subsequently, a battery cell according to an embodiment of the inventive concept will be described below. FIGS. 24 and 25 illustrate a battery cell 100 according to an embodiment. As shown in FIGS. 24 and 25, the battery cell 100 according to an embodiment may include the electrode assembly 1 according to the embodiment inside a battery case 120. The battery case 120 may be a pouch type case.

The pouch type case may be formed of a laminate sheet, and in this case, the laminate sheet may be configured to include an outer resin layer forming an outermost portion, a blocking metal layer preventing penetration of a material, and an inner resin layer for sealing, but should not be considered as being limited thereto.

In addition, the battery case may have a structure in which an electrode lead electrically connecting electrical terminals of the electrode units of the electrode assembly to each other is exposed externally. Although not shown in the drawing, insulating films for protecting the electrode lead may be adhered to upper and lower surfaces of the electrode lead.

In addition, the battery case 120 may have various shapes depending on a shape of the electrode assembly according to an embodiment. The shape of the battery case may be formed in a scheme in which a battery case itself is varied. In this case, the shape of size of the battery case may not necessarily coincide with those of the electrode assembly, and thus, any shape and size able to prevent occurrence of internal shorts due to a slip phenomenon of the electrode assembly may be employed. On the other hand, the shape of the battery case according to an embodiment should not be considered to be limiting, and various shapes and sizes of the battery cases may be applied as needed.

For example, the battery case may have a step depending on a shape of the electrode assembly 1 having a step according to an embodiment of the inventive concept as illustrated in FIG. 24. Further, as shown in FIG. 25, the battery case 120 may include an inclined surface on a surface on which the steps of the electrode assembly 1 are formed. That is, in the area forming the steps of the electrode assembly 1, the battery case 120 may contact upper edges of respective stages and corner portions to form an inclined surface. Such an inclined surface may include a curved surface and may have at least two gradients.

A battery cell according to an embodiment may be a lithium ion battery or a lithium ion polymer battery, but should not be considered to be limited thereto.

The battery cell according to the embodiment may be used alone, or may be used in a battery pack form including at least one battery cell. At least one of the battery cell and the battery pack may be usefully employed in various devices, for example, a mobile phone, a portable computer, a smartphone, a smartpad, a netbook computer, a light electric vehicle, an electric vehicle, a hybrid electric vehicle, a plug-in hybrid electric vehicle, a power storage device, or the like. Since the structure of the devices as described above and a method of manufacturing the same are publicly known, a detailed description thereof will be omitted.

On the other hand, when a battery cell or a battery pack according to an embodiment is mounted in a device as described above, systematic components of a device may be disposed in extra space formed by the structure of the battery cell or battery pack according to an embodiment. Since a battery cell or a battery pack according to an embodiment is produced using an electrode assembly having a difference size, the electrode assembly itself may be formed to have a step, and when a battery case is formed to correspond to an electrode shape and is then mounted in a device, surplus space, not formed in an angular type or elliptic type battery cell or battery pack according to the related art, may be generated.

When systematic components of the device are mounted in the surplus space as described above, since systematic components of a device, a battery cell or a battery pack may be flexibly disposed, a thickness or a volume of the entire device may be reduced as well as improving space occupancy, thereby implementing a slim design.

The invention claimed is:

1. An electrode assembly including an electrode laminate comprising:
   a plurality of electrode units rolled up to be stacked on one another in at least two rectangular-shaped separation films, the at least two separation films having first and second ends and coextending with each other in a same direction between the first and second ends, the electrode assembly being characterized in that different rectangular-shaped separation films are disposed on upper and lower surfaces of at least a portion of an electrode unit among the plurality of electrode units, and the electrode laminate includes at least one step formed by stacking an electrode unit having a difference in area from an electrode unit adjacent thereto, having one of the rectangular shaped separation films as a boundary therebetween, and
   a space region defined between the at least two separation films in which the plurality of electrode units is not disposed, the space region being formed at an initial position of the separation films, or between an initially folded electrode unit and a second electrode unit adjacent thereto,
   wherein the respective electrode unit is selected from a group configured of unit cells in which a cathode, an anode, and at least one cathode and at least one anode having a separation film interposed therebetween are alternately stacked on one another;
   wherein only a single electrode is stacked on one stacking surface of upper and lower portions of the electrode laminate,
   wherein the single electrode forms the step together with the electrode laminate; and
   wherein the electrode laminate includes a first laminate having a Z-folding scheme that zig-zags back and forth between two sides of the electrode laminate, and a second laminate having a winding scheme that is rolled up in a single direction, each of the two separation films being folded to form a portion of both the first laminate and the second laminate.

2. The electrode assembly of claim 1, wherein the step is provided in an amount of one or two.

3. The electrode assembly of claim 1, wherein the step is formed by allowing electrodes having opposing polarities to face each other, having the rectangular shaped separation film as a boundary therebetween.

4. The electrode assembly of claim 3, wherein among the electrodes having opposing polarities, an electrode having a relatively large area is a cathode.

5. The electrode assembly of claim 1, wherein the respective unit cell is at least one selected from a group configured of a jelly-roll type unit cell, a stacked type unit cell, a laminated and stacked type unit cell, and a stacked and folded type unit cell.

6. The electrode assembly of claim 5, wherein the unit cell includes at least one step.

7. The electrode assembly of claim 1, wherein the single electrode is an electrode having a polarity different from an electrode disposed on an edge of the stacking surface of the electrode laminate.

8. The electrode assembly of claim 1, wherein the electrode units have the same thickness or different thicknesses.

9. The electrode assembly of claim 1, wherein an electrode disposed on an outermost portion of the electrode assembly in a thickness direction thereof is a single surface coated electrode having an uncoated portion without being coated with an electrode on one surface thereof, the uncoated portion is disposed to be directed toward the outside, and the separation film is exposed to the outside.

10. The electrode assembly of claim 1, wherein the electrode laminate includes at least one electrode unit having at least one corner portion having a curved-surface shape.

11. The electrode assembly of claim 1, wherein the electrode units having the at least one corner portion having the curved-surface shape are provided in an amount of at least two, and the at least one electrode unit has a corner portion having a curved-surface shape having curvature different from that of other electrode units.

12. The electrode assembly of claim 1, wherein the electrode laminate is stacked such that areas of the electrode units are reduced, in a thickness direction in which the electrode units are stacked.

13. The electrode assembly of claim 1, wherein the electrode laminate is stacked in an array in which one corners of the respective electrode units coincide with each other.

14. The electrode assembly of claim 1, wherein the electrode laminate is stacked such that one of the electrode units adjacent to each other is included in a stacking surface of a different electrode unit.

15. The electrode assembly of claim 14, wherein the electrode laminate is stacked such that centers of the electrode units coincide with each other.

16. The electrode assembly of claim 1, wherein the electrode units include an electrode tab corresponding to a polarity of a respective electrode, and the electrode tabs have the same size or different sizes.

17. The electrode assembly of claim 1, wherein the electrode tab is adhered to an end of one of the electrode units or ends thereof facing each other.

18. A battery cell provided by including the electrode assembly of claim 1, accommodated in a battery case.

19. The battery cell of claim 18, wherein the battery case is a pouch type case.

20. The battery cell of claim 19, wherein the battery case receives the electrode assembly therein and includes a step or an inclined surface to correspond to a shape of the electrode assembly.

21. The battery cell of claim 18, wherein the battery cell is a lithium ion secondary battery or a lithium ion polymer secondary battery.

22. A device comprising at least one battery cell of claim 18.

23. The device of claim 22, wherein the battery cell includes a systematic component of the device in a surplus space thereof.

24. The device of claim 22, wherein the device is a mobile phone, a portable computer, a smartphone, a smartpad, a netbook computer, a light electric vehicle, an electric vehicle, a hybrid electric vehicle, a plug-in hybrid electric vehicle, or a power storage device.

25. The electrode assembly of claim 1, wherein the separation films are parallel and coextend with each other while winding the plurality of electrodes in a same direction.

26. The electrode assembly of claim 1, wherein the space region has a length that is greater than a length of one of the electrode units.

27. The electrode assembly of claim 1, wherein the space region is formed at an initial position of the separation films.

28. The electrode assembly of claim 1, wherein the space region is formed between an initially folded electrode unit and a second electrode unit adjacent thereto.

29. The electrode assembly of claim 1, wherein at least a portion of the second laminate is covered with two distinct separators that overlap one another.

* * * * *